Aug. 14, 1923.

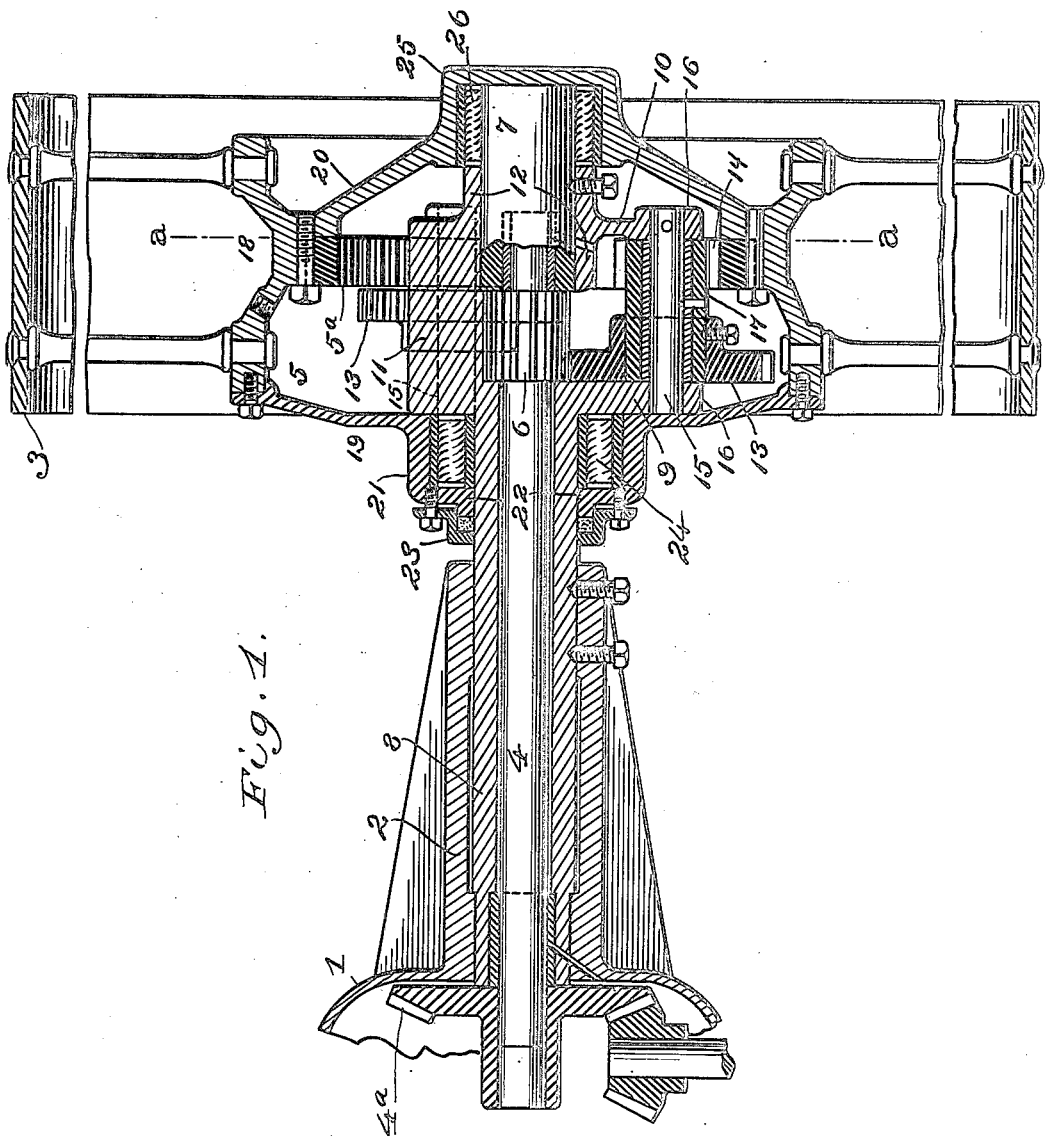

E. EINFELDT 1,464,978

WHEEL DRIVING MECHANISM

Filed Aug. 3, 1921  2 Sheets-Sheet 2

INVENTOR
Emil Einfeldt
By
Rogers, Kennedy & Campbell
ATTORNEYS

Patented Aug. 14, 1923.

1,464,978

UNITED STATES PATENT OFFICE.

EMIL EINFELDT, OF DAVENPORT, IOWA.

WHEEL-DRIVING MECHANISM.

Application filed August 3, 1921. Serial No. 489,414.

*To all whom it may concern:*

Be it known that I, EMIL EINFELDT, a citizen of the United States, residing at Davenport, in the county of Scott and State of Iowa, have invented certain new and useful Improvements in Wheel-Driving Mechanism, of which the following is a specification, reference being had therein to the accompanying drawing.

This invention relates to tractors, motor trucks and the like and has reference more particularly to the reduction drive gearing for the traction wheel, which in certain types of mechanism is housed or contained within the wheel itself. The object of the invention is to provide a strong and durable construction in which the parts will be solidly and firmly mounted and supported and the driving power will be transmitted to the wheel in a uniform, effective and efficient manner without side stresses on the driving shaft or the wheel; and in which the gearing will be compactly and effectually housed oil tight and dust tight. With these and other objects in view my invention consists in various improved features of construction and arrangement of parts which will be fully described in the specification to follow and the novel parts of which will be set forth in the appended claims.

In the accompanying drawings:

Fig. 1 is a vertical axial section through a traction wheel and its driving gearing having my invention embodied therein.

Figure 3:
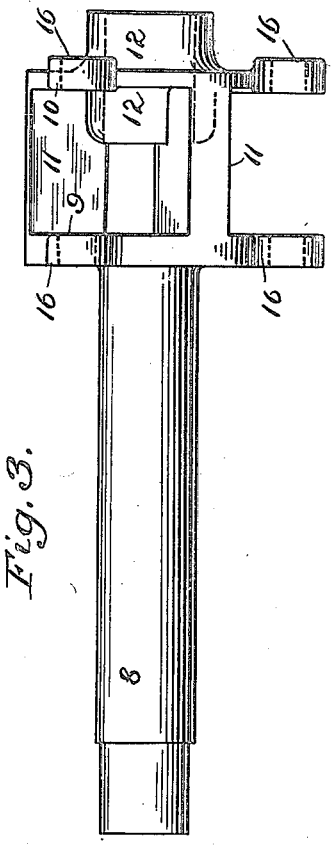
Fig. 3 is a side elevation of a detail for giving bearing support to the driving axle and the reduction gearing.
Figure 5:
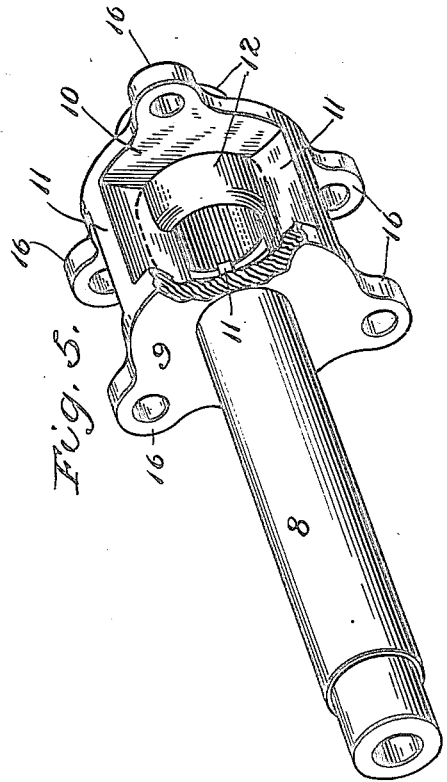
Fig. 5 is a perspective view of the same.
Figure 2:
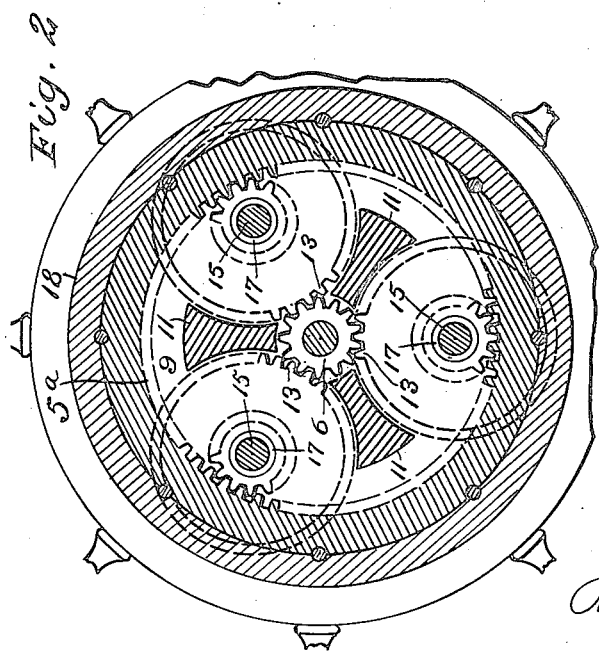
Fig. 2 is a transverse section of the same on the line *a—a* of Fig. 1.
Figure 4:
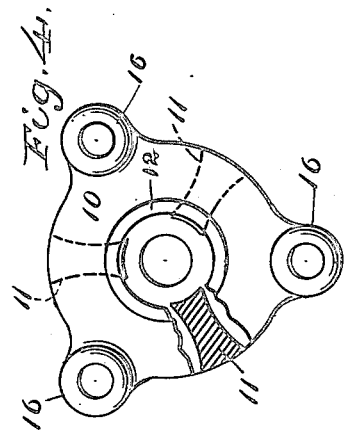
Fig. 4 is an end elevation of the same.

Referring to the drawings:

1 designates a portion of the fixed housing or differential gear case of a motor vehicle, which housing projects laterally from the case and supports the body of the vehicle; 2 designates a sleeve fixed within the housing and projecting beyond the outer end of the same so as to afford a support for the traction wheel 3; and 4 designates the driving axle which extends through the sleeve and receives support therefrom and is suitably driven, for instance by a beveled pinion 4ª on its inner end. The hub 5 of the traction wheel surrounds the projecting end of the sleeve and is provided with an internal rack 5ª which is engaged and driven by a reducing gearing mounted on the sleeve, and which gearing in turn is driven by a pinion 6 on the drive axle. The hub of the wheel is rotatably supported at its inner end by the sleeve 2, and at its outer end by a stud 7 fixed within the outer end of the sleeve and provided in its inner end with a central bearing opening in which the outer end of the driving axle is journaled and receives rotative support at this end. At its opposite end the axle receives rotative support from the sleeve 2 by means of a bushing 8 fixed within the sleeve and surrounding the axle, which latter runs free of the sleeve between its two points of support. The outer end of the sleeve within the hub of the wheel is formed with an enlargement or head consisting of an inner disc or spider 9 and an outer disc or spider 10, said discs being spaced from each other and maintained in fixed spaced relations by means of a number of axially extending connecting ribs 11, three in the present instance, spaced at equal intervals around the discs and extending between the same and radially from the peripheries of the discs some distance toward the center, it being understood that the central axial opening through the sleeve continues on through the two discs. A boss 12 surrounds the opening in the outer disc and projects on both sides of the same, and the stud 7, which affords a bearing for the outer end of the driving axle as before described, is mounted and firmly fastened in the boss and receives extended and rigid support therefrom. The sleeve 2 with its head comprising the two discs the connecting ribs and the boss, are preferably all integrally connected and constitute a single unitary structure as shown in Figs. 3, 4 and 5; and this structure may be fastened fixedly in the housing 1 by means of fastening screws as shown, or by means of a key or other device which will permit it to be detached therefrom.

The reducing gearing before alluded to as being carried by the sleeve, is mounted in the head portion thereof between the discs 9 and 10, and in the present instance it comprises three sets of pinions each consisting of a pinion 13 engaged and driven by the axle pinion 6, and a connected relatively small pinion 14 engaging and driving the rack 5ᵃ on the wheel, the larger pinions being staggered relatively to each other or arranged in different vertical planes, so that they will mesh with the pinion 6 at different points in its length; whereby the wear on the pinion 6 is distributed and not confined to one point as it would be if the engagement of the three pinions with the axle pinion was in a common plane.

The mounting of the pinion sets between the discs of the sleeve-head is effected in the present instance by means of three studs 15 seated and fixed at their ends in holes in lugs 16 projecting from the peripheries of the discs. On these studs, hollow shafts 17 are rotatably mounted, and each shaft has fixed to it one of the larger pinions 13 and one of the smaller pinions 14. The smaller pinions are all mounted in the same common plane so that they will all mesh with the rack on the wheel, while the larger pinions as before mentioned, are disposed in different vertical planes so as to engage the common axle pinion at different points in its length.

The form of the wheel hub and its mounting is such that the gearing is effectually enclosed oil tight and dust tight. As shown in Fig. 1 the hub comprises an annular portion 18 to which the spokes are connected and which carries the internal rack 5ᵃ, an inner substantially flat radial portion 19 having a central opening surrounding the sleeve 2, and an outer cap portion 20 which surrounds the outer end of the stud 7, these three portions constituting in effect an enclosure or shell which surrounds and encloses the outer ends of the sleeve, the axle and the pinions carried thereby. The radial inner portion of the hub bears at its inner end flatly against the vertical face of the inner disc 9 of the sleeve-head and is provided with a neck 21 extending axially inwardly and spaced from and surrounding the sleeve, from which neck an annular flange 22 extends radially toward the sleeve and bears against the outer surface of the same. A stuffing box 23 is applied to the flange to prevent the escape of oil between the same and the sleeve, and anti-friction rollers 24 are arranged in the annular space between the neck and sleeve to reduce the friction at this point to a minimum. The cap portion of the hub is formed with a central hollow outwardly projecting boss 25 the annular rim of which surrounds the outer end portion of the stud 7 and is spaced therefrom, while the closed end of the boss abuts against the outer end of the stud, and a series of anti-friction rollers 26 are arranged in the space between the rim of the boss and stud and thus relieve the friction at this point. Due to the construction and arrangement of the parts described, the wheel hub is given firm and frictionless support at its opposite ends and at widely separated points by the fixed sleeve 2, while at the same time the reducing gearing is completely enclosed and housed in such manner that the escape of the lubricant therefrom and the entrance of dust therein is effectively prevented.

The construction as a whole provides a very strong, durable and firm support for the wheel, the driving axle and the gearing by which the motion is transmitted from the axle to the wheel, and enables the motion of the axle to be transmitted at the proper speed reduction in a uniform, reliable and effective manner and without side stresses either on the wheel or the axle. By forming the axle bearing sleeve with the gear supporting head as an integral unitary structure, with the wheel hub supported thereby as described, a very firm and solid construction is produced with no parts which may work loose or shift out of alignment, the three ribs 11 in the sleeve-head giving the same great strength and affording a solid and firm bearing support for the axle at its outer end. The inner radial portion of the hub, by surrounding the sleeve at the inner side of the head thereon, enables me to employ a stuffing box of small diameter with correspondingly less care and trouble in maintaining it oil tight. The wide face of the driving axle pinion enables the reducing gear sets to be arranged so that the wear will not be concentrated at one point on the axle pinion. Due to this arrangement, the wear on the axle pinion and the pinions driven thereby is equal and will not be greater on one than on the other.

By the provision of the stud 7 containing the central bearing opening in which the outer end of the driving axle is journalled, the latter together with the pinion 6 thereon may be withdrawn outwardly from the bearing sleeve by first removing the wheel, the detachable connection of the radial portion of the hub shell to the main body thereof by the bolts 28 or equivalent means permitting the wheel to be thus removed.

In the foregoing description and accompanying drawings I have set forth my invention in the particular detailed form and construction of the parts which I prefer to adopt, but it will be manifest to the skilled mechanic that these details may be variously changed and modified without departing from the spirit of the invention. For instance instead of mounting the outer end of the hub on the stud in which the outer end of the driving axle is journaled, this stud may be omitted, and the axle continued on through the cap portion of the hub, and a stuffing box applied to the cap portion around the shaft similar to the stuffing box on the inner end of the hub.

It may in some cases be desirable to extend the stud 7 through the cap portion of the hub and apply a stuffing box to the cap portion around the stud, similar to the stuffing box at the inner end of the hub, so that where in a one wheel drive the body extends on both sides of the drive wheel, the body will receive proper support at its outer side by the stud.

Having thus described my invention, what I claim is:

1. In combination with a wheel provided with a driving rack, a fixed supporting member on which the wheel is rotatably mounted, a rotary driving axle, an axle pinion rotatable therewith, a series of gears mounted on the supporting member and engaged with the axle pinion at different points in its length, and pinions rotatable with said gears and engaging the driving rack.

2. In combination with a wheel having a hub provided with an internal driving rack, a fixed supporting sleeve on which the hub is rotatably mounted, a driving axle rotatably mounted within the supporting sleeve, an axle pinion on the axle, and a plurality of gear sets mounted on the fixed sleeve within the hub, each gear set comprising a gear and a connected pinion, the said gears being disposed in different vertical planes and engaging the axle pinion at different points in its length and the connected pinions engaging said driving rack.

3. In combination with a wheel having a hub provided with a driving rack, a fixed supporting sleeve on which the hub is rotatably mounted, said sleeve having a head portion disposed within the hub and comprising two spaced discs connected by longitudinal ribs, gear sets mounted between the discs of the head, a driving axle rotatable in the sleeve, and an axle pinion on the axle, said gear sets engaging the axle pinion and the driving rack.

4. In combination with a fixed supporting sleeve, a driving axle mounted therein, a stud mounted in the end of the sleeve in alignment with said axle and provided with a bearing in which the end of the axle is journalled, an axle pinion on the axle, a wheel having a hub rotatably mounted on the sleeve and stud, and having a driving rack, and gear sets mounted on the sleeve and engaging the axle pinion and the rack.

5. In combination with a fixed supporting sleeve having a head portion, a driving axle mounted in the sleeve, a stud mounted in the head portion of the sleeve in alignment with the axle and provided with a bearing in which the end of the axle is journalled, a wheel having a hub enclosing the head portion of the sleeve and provided with a driving rack, said hub being rotatably supported at its inner end by the sleeve at the inner side of the head and being rotatably supported at its outer end by the stud, and an axle pinion on the axle within the head portion of the sleeve and engaging the axle pinion and the driving rack.

6. In combination with a fixed supporting sleeve, a stud fixed in the end of the same and formed with a bearing opening, a driving axle rotatable within the sleeve with its outer end journalled in said bearing opening, an axle pinion on the driving axle, a rotatable wheel having an enclosing hub shell provided with a driving rack, said hub shell having an inner portion surrounding and supported by the sleeve and having an outer cap portion surrounding and supported by the stud, and reducing gears mounted on the sleeve and engaging the axle pinion and the driving rack.

7. In combination with a fixed supporting sleeve provided with a head portion, a plurality of reducing gears mounted therein, a stud fixed in the head portion of the sleeve, a driving axle rotatably mounted within the sleeve and having a bearing at its outer end in the stud, an axle pinion on the axle engaging the reducing gears, a rotary wheel having a hub shell enclosing the head portion of the sleeve and the gears carried thereby and provided with an internal driving rack, the inner portion of the hub shell abutting against the inner side of the sleeve head and closely surrounding the sleeve and rotatably supported thereby, and the outer portion of the hub shell having a cap surrounding the stud and supported thereby and abutting against the outer end of the stud.

8. In combination with a fixed supporting sleeve, a bearing stud removably sustained thereby in axial alignment with the same, a driving axle mounted within the sleeve and journalled at its outer end in the stud, an axle pinion on the axle, a wheel having a hub portion provided with a driving rack and rotatably supported by the sleeve and stud, and reducing gears mounted on and sustained by the sleeve independently of the bearing stud and engaging the axle pinion and rack, said axle and pinion being removable endwise from the sleeve by first removing the bearing stud.

9. In combination with a supporting sleeve provided with a head portion comprising two longitudinally spaced discs and axially extending connecting ribs, reducing gear sets rotatably mounted between the discs and ribs and comprising two pinions of relatively different diameters, a driving axle rotatably mounted in the sleeve, an axle pinion on the axle disposed in the plane of the ribs and engaging the larger pinions of the gear sets, and a wheel having a hub rotatably supported by the fixed sleeve and enclosing the sleeve head and the reducing gears, said hub having an internal driving rack engaged by the smaller pinions of the gear sets.

10. In combination with a fixed supporting sleeve having an axial opening in its end, a bearing stud mounted in said opening and removable endwise therefrom, a driving axle journaled in the sleeve and having a bearing at its outer end in said bearing stud, an axle pinion on the axle removable endwise through the axial opening in the sleeve, a wheel having a hub portion provided with a driving rack, said wheel being rotatably supported by the sleeve and stud, and reducing gears mounted on the sleeve and engaging the axle pinion and rack.

In testimony whereof, I have affixed my signature hereto.

EMIL EINFELDT.